United States Patent
Zheng et al.

(10) Patent No.: US 9,514,569 B2
(45) Date of Patent: Dec. 6, 2016

(54) METHOD AND APPARATUS FOR CONVERTING TWO-DIMENSIONAL IMAGE INTO THREE-DIMENSIONAL IMAGE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yi Zheng, Beijing (CN); Yao Yu, Beijing (CN); Lingyun Shi, Beijing (CN); Xin Li, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 249 days.

(21) Appl. No.: 14/359,207

(22) PCT Filed: Aug. 7, 2013

(86) PCT No.: PCT/CN2013/080956
§ 371 (c)(1),
(2) Date: May 19, 2014

(87) PCT Pub. No.: WO2014/153910
PCT Pub. Date: Oct. 2, 2014

(65) Prior Publication Data
US 2015/0235414 A1 Aug. 20, 2015

(30) Foreign Application Priority Data
Mar. 28, 2013 (CN) .......................... 2013 1 0105607

(51) Int. Cl.
G06T 15/00 (2011.01)
G06T 17/10 (2006.01)
H04N 13/02 (2006.01)

(52) U.S. Cl.
CPC ............ *G06T 17/10* (2013.01); *H04N 13/026* (2013.01)

(58) Field of Classification Search
CPC ........................... H04N 13/026; G06T 17/10
USPC ................. 345/419, 420, 552, 619
See application file for complete search history.

(56) References Cited

U.S. PATENT DOCUMENTS

| 6,944,225 B2 * | 9/2005 | Li ......................... H04N 19/63 |
| | | 375/240.18 |
| 8,160,149 B2 * | 4/2012 | Demos ................. H04N 19/597 |
| | | 375/240.16 |

(Continued)

FOREIGN PATENT DOCUMENTS

CN 102496138 A 6/2012

OTHER PUBLICATIONS

PCT Written Opinion of International Searching Authority (Chinese language), in International Application No. PCT/CN2013/080956, dated Jan. 2, 2014; 3 pages.

(Continued)

*Primary Examiner* — Phu K Nguyen
(74) *Attorney, Agent, or Firm* — Ladas & Parry LLP

(57) ABSTRACT

The present disclosure provides a method for converting a Two-Dimensional image into a Three-Dimensional image, comprising: obtaining high-frequency components and low-frequency component of the current frame, and high-frequency components of the reference frame; establishing triangular geometric models in the three directions of horizontal, vertical and diagonal, respectively; performing a motion search on the high-frequency components of the reference frame in the three directions of horizontal, vertical and diagonal, respectively, so as to obtain motion vectors in the corresponding directions, and calculating depth variations of the corresponding directions according to the motion vectors in the corresponding directions; performing an interpolating operation on the triangular geometric models in the three directions of horizontal, vertical and diagonal, respectively, according to the depth variations in the corresponding directions, so as to obtain high-frequency depth graphs in the corresponding directions; and completing a filtering reconstruction by performing an inversion wavelet transform on the high-frequency depth graphs in the three directions of horizontal, vertical and diagonal and the low-frequency component of the current frame, respectively, so as to construct a three-dimensional video image. With the present disclosure, a conversion to the 3D image from the 2D image may be realized.

10 Claims, 3 Drawing Sheets

(56) References Cited

U.S. PATENT DOCUMENTS

| | | | | |
|---|---|---|---|---|
| 8,743,949 B2* | 6/2014 | Srinivasan | ............ | H04N 19/136 375/240 |
| 8,767,822 B2* | 7/2014 | Zuo | ...................... | H04N 19/176 375/240.03 |
| 8,908,768 B2* | 12/2014 | Hsu | ....................... | H04N 19/136 375/240.16 |
| 9,185,417 B2* | 11/2015 | Sethu | ................... | H04N 19/172 |
| 9,258,570 B2* | 2/2016 | Srinivasan | ............ | H04N 19/136 |

OTHER PUBLICATIONS

English translation of PCT Written Opinion of International Searching Authority, in International Application No. PCT/CN2013/080956, dated Jan. 2, 2014; 4 pages.

English Language Abstract of CN102496138A; 2 pages.

* cited by examiner

METHOD AND APPARATUS FOR CONVERTING TWO-DIMENSIONAL IMAGE INTO THREE-DIMENSIONAL IMAGE

CROSS REFERENCE TO RELATED APPLICATIONS

This application is based on International Application No. PCT/CN2013/080956 filed on Aug. 7, 2013, which claims priority to Chinese National Application No. 201310105607.1 filed on Mar. 28, 2013. The entire contents of each and every foregoing application are incorporated herein by reference.

TECHNICAL FIELD

The present disclosure relates to a technique of image conversion, and particularly to a method and an apparatus for converting a Two-Dimensional (2D) image into a Three-Dimensional (3D) image.

BACKGROUND

A Two-Dimensional technique, also referred to as a 2D technique, belongs to one of plane techniques. Content in one plane has two dimensions which only indicate two directions of up-down and left-right and fails to comprise any information on a direction of forward-backward.

A Three-Dimensional technique is also referred to as a 3-D technique. The three dimensions refer to a space system composed by adding a directional vector to the two dimensions in one plane, and are represented as three axes in a coordinate system: a X-axis, a Y-axis and a Z-axis, where the X-axis represents a left-right space, the Y-axis represents a up-down space, and the Z-axis represents a forward-backward space, so that a visual stereogram effect is formed.

Recently the Three-Dimensional technique has been developed rapidly, and multiple entities in the industry try to draft standards for Three-Dimensional TV content, and encoding and transmission for Three-Dimensional TV content, however a projection apparatus and a video camera for the Three-Dimensional images are high-cost and are not popular. Currently the development of the Two-Dimensional image is very mature, and the Two-Dimensional technique has a perfect and low-cost application system.

If the Two-Dimensional image may be converted into the Three-Dimensional image in real time, and projected in stereo by the projection apparatus for the Two-Dimensional image, the above problem may be settled. However the prior art fails to propose a method for converting the Two-Dimensional image into the Three-Dimensional image and playing the Three-Dimensional image by the projection apparatus for the Two-Dimensional image.

SUMMARY

In view of above, a major object of the present disclosure is provided a method and an apparatus for converting a Two-Dimensional (2D) image into a Three-Dimensional (3D) image, in order to realize a conversion to the 3D image from the 2D image.

In order to achieve the above object, the present disclosure provides solutions as follows.

In the present disclosure, there is provided a method for converting a Two-Dimensional image into a Three-Dimensional image, comprising:

in a step A, performing a lifting wavelet transform on a current frame and a reference frame of a two-dimensional video image signal, respectively, to obtain high-frequency components and low-frequency component of the current frame, and high-frequency components of the reference frame, the high-frequency components comprise high-frequency components in three directions of horizontal, vertical and diagonal;

in a step B, establishing triangular geometric models in the three directions of horizontal, vertical and diagonal, respectively, according to the high-frequency components of the current frame;

in a step C, performing a motion search on the high-frequency components of the reference frame in the three directions of horizontal, vertical and diagonal, respectively, by using the triangular geometric models of the current frame, so as to obtain motion vectors in the corresponding directions, and calculating depth variations in the corresponding directions according to the motion vectors in the corresponding directions;

in a step D, performing an interpolating operation on the triangular geometric models in the three directions of horizontal, vertical and diagonal, respectively, according to the depth variations in the corresponding directions, so as to obtain high-frequency depth graphs in the corresponding directions; and in a step E, completing a filtering reconstruction by performing an inversion wavelet transform on the high-frequency depth graphs in the three directions of horizontal, vertical and diagonal and the low-frequency component of the current frame, respectively, so as to construct a three-dimensional video image.

Preferably, the step A comprises:

setting an ith data frame $x^i(n)$ of the two-dimensional video image signal as the current frame or the reference frame;

decomposing the $x^i(n)$ as an odd sequence $x_o^i(n)=x(2n+1)$ and an even sequence $x_e^i(n)=x(2n)$;

predicting the odd sequence using the even sequence $x_e^i(n)=x(2n)$ by a correlation between the odd sequence and the even sequence to obtain a prediction value $$\sum_k p^i \cdot x_e^i(n-k),$$

then subtracting the prediction value from the odd sequence $x_o^i(n)=x(2n+1)$ to obtain the odd sequence $X_o^i(n)$ of the ith data frame as $$X_o^i(n) = x_o^i(n) - \sum_k p^i \cdot x_e^i(n-k),$$

where the $p^i$ is a prediction operator for predicting the odd sequence using the even sequence of the ith data frame, and the k is a scaling coefficient;

filtering the predicted odd sequence $X_o^i(n)$, and subtracting the filtering result from the even sequence $x_e^i(n)=x(2n)$ so as to obtain the even sequence $X_e^i(n)$ of the ith data frame as $$X_e^i(n) = x_e^i(n) - \sum_k U^i(k) \cdot x_o^i(n),$$

where $$\sum_k U^i(k) \cdot x_o^i(n)$$

is the filtering result, and the $U^i(k)$ is a updating operator;

multiplying the $X_e^i(n)$ with a scaling coefficient 1/k and multiplying the $X_o^i(n)$ with the scaling coefficient k to obtain approximate details of the data frame $x^i(n)$ as $x_{low}^i(n)=X_e^i(n)/k$ and $x_{high}^i(n)=X_o^i(n)\cdot k$, where the $x_{low}^i(n)$ is the low-frequency component of the ith data frame, while the $x_{high}^i(n)$ is the high-frequency component of the ith data frame; and filtering the $x_{high}^i(n)$ in the three directions of horizontal, vertical and diagonal, respectively, to obtain the high-frequency components of the ith data frame in the three directions.

Preferably, the step B comprises:

setting vertex coordinate of each of three vertexes of each of the triangular geometric models as (x, y, z), where the x is a coordinate in the horizontal direction, the y is a coordinate in the vertical direction, and the z is a coordinate in the diagonal direction;

establishing the triangular geometric model in the horizontal direction according to changes in the z coordinate in a situation that the y coordinate is unchanged while the x coordinate increases;

establishing the triangular geometric model in the vertical direction according to changes in the z coordinate in a situation that the x coordinate is unchanged while the y coordinate increases; and establishing the triangular geometric model in the diagonal direction according to changes in the z coordinate in a situation that both the y coordinate and the x coordinate change.

Preferably, the step C comprises:

calculating a motion vector in the horizontal direction as $MV=W_p\sqrt{MV_x^2+MV_z^2}$;

calculating a motion vector in the vertical direction as $MV=W_p\sqrt{MV_y^2+MV_z^2}$;

calculating a motion vector in the diagonal direction as $MV=W_p\sqrt{MV_x^2+MV_y^2+MV_z^2}$;

where the $MV_x$ is difference between the x coordinates in the current frame and the reference frame, the $MV_y$ is difference between the y coordinates in the current frame and the reference frame, the $MV_z$ is difference between the z coordinates in the current frame and the reference frame, and the $W_p$ is a constant;

calculating a depth variation in each of the three directions by an equation $$d(z) = \frac{255 \times (MV - MV_{min})}{MV_{max} - MV_{min}},$$

where the $MV_{min}$ is a minimum value of the motion vectors in the corresponding direction, and the $MV_{max}$ is a maximum value of the motion vectors in the corresponding direction.

Preferably, the step D comprises: interpolating the depth value z of the triangular geometric model in each of the three directions with an interpolation value which is ½ of the depth variation d(Z) in the corresponding direction to get z'=z+d(Z)/2; and acquiring the high-frequency component of the z' in the corresponding direction as the high-frequency depth graph in the corresponding direction.

In the present disclosure, there is further provided an apparatus for converting a Two-Dimensional image into a Three-Dimensional image, comprising:

a lifting wavelet transforming module for performing a lifting wavelet transform on a current frame and a reference frame of a two-dimensional video image signal, respectively, to obtain high-frequency components and low-frequency component of the current frame, and high-frequency components of the reference frame, the high-frequency components comprise high-frequency components in three directions of horizontal, vertical and diagonal;

a geometric model establishing module for establishing triangular geometric models in the three directions of horizontal, vertical and diagonal, respectively, according to the high-frequency components of the current frame;

a motion searching module for performing a motion search on the high-frequency components of the reference frame in the three directions of horizontal, vertical and diagonal, respectively, by using the triangular geometric models of the current frame, so as to obtain motion vectors in the corresponding directions, and calculating depth variations in the corresponding directions according to the motion vectors in the corresponding directions;

an interpolation operating module for performing an interpolating operation on the triangular geometric models in the three directions of horizontal, vertical and diagonal, respectively, according to the depth variations in the corresponding directions, so as to obtain high-frequency depth graphs in the corresponding directions; and a reconstruction module for completing a filtering reconstruction by performing an inversion wavelet transform on the high-frequency depth graphs in the three directions of horizontal, vertical and diagonal and the low-frequency component of the current frame, respectively, so as to construct a three-dimensional video image.

Preferably, the lifting wavelet transforming module is further used for: setting an ith data frame $x^i(n)$ of the two-dimensional video image signal as the current frame or the reference frame;

decomposing the $x^i(n)$ as an odd sequence $x_o^i(n)=x(2n+1)$ and an even sequence $x_e^i(n)=x(2n)$;

predicting the odd sequence using the even sequence $x_e^i(n)=x(2n)$ by a correlation between the odd sequence and the even sequence to obtain a prediction value $$\sum_k p^i \cdot x_e^i(n-k),$$

then subtracting the prediction value from the odd sequence $x_o^i(n)=x(2n+1)$ to obtain the odd sequence $X_o^i(n)$ of the ith data frame as $$X_o^i(n) = x_o^i(n) - \sum_k p^i \cdot x_e^i(n-k),$$

where the $p^i$ is a prediction operator for predicting the odd sequence using the even sequence of the ith data frame, and the k is a scaling coefficient;

filtering the predicted odd sequence $X_o^i(n)$, and subtracting the filtering result from the even sequence $x_e^i(n)=x(2n)$ so as to obtain the even sequence $X_e^i(n)$ of the ith data frame as $$X_e^i(n) = x_e^i(n) - \sum_k U^i(k) \cdot x_o^i(n),$$

where $$\sum_k U^i(k) \cdot x_o^i(n)$$

is the filtering result, and the $U^i(k)$ is a updating operator;

multiplying the $X_e^i(n)$ with a scaling coefficient 1/k and multiplying the $X_o^i(n)$ with the scaling coefficient k, so as to obtain approximate details of the data frame $x^i(n)$ as $x_{low}^i(n)=X_e^i(n)/k$ and $x_{high}^i(n)=X_o^i(n)\cdot k$, where the $x_{low}^i(n)$ is the low-frequency component of the ith data frame, while the $x_{high}^i(n)$ is the high-frequency component of the ith data frame; and filtering the $x_{high}^i(n)$ in the three directions of horizontal, vertical and diagonal, respectively, so as to obtain the high-frequency components of the ith data frame in the three directions.

Preferably, the geometric model establishing module is further used for: setting vertex coordinate of each of three vertexes of each of the triangular geometric models as (x, y, z), where the x is a coordinate in the horizontal direction, the y is a coordinate in the vertical direction, and the z is a coordinate in the diagonal direction; establishing the triangular geometric model in the horizontal direction according to changes in the z coordinate in a situation that the y coordinate is unchanged while the x coordinate increases; establishing the triangular geometric model in the vertical direction according to changes in the z coordinate in a situation that the x coordinate is unchanged while the y coordinate increases; and establishing the triangular geometric model in the diagonal direction according to changes in the z coordinate in a situation that both the y coordinate and the x coordinate change.

Preferably, the motion searching module is further used for: calculating a motion vector in the horizontal direction as $MV=W_p\sqrt{MV_x^2+MV_z^2}$; calculating a motion vector in the vertical direction as $MV=W_p\sqrt{MV_y^2+MV_z^2}$; calculating a motion vector in the diagonal direction as $MV=W_p\sqrt{MV_x^2+MV_y^2+MV_z^2}$; where the $MV_x$ is difference between the x coordinates in the current frame and the reference frame, the $MV_y$ is difference between the y coordinates in the current frame and the reference frame, the $MV_z$ is difference between the z coordinates in the current frame and the reference frame, and the $W_p$ is a constant; calculating a depth variation in each of the three directions by an equation $$d(z) = \frac{255 \times (MV - MV_{min})}{MV_{max} - MV_{min}},$$

where the $MV_{min}$ is a minimum value of the motion vectors in the corresponding direction, and the $MV_{max}$ is a maximum value of the motion vectors in the corresponding direction.

Preferably, the interpolation operating module is further used for: interpolating the depth value z of the triangular geometric model in each of the three directions with an interpolation value which is ½ of the depth variation d(Z) in the corresponding direction to get z'=z+d(Z)/2; and acquiring the high-frequency component of the z' in the corresponding direction as the high-frequency depth graph in the corresponding direction.

The method and the apparatus for converting the Two-Dimensional image into the Three-Dimensional image perform the lifting wavelet transform on the current frame and the reference frame of the two-dimensional video image signal, respectively, to obtain the high-frequency components and the low-frequency component of the current frame, and the high-frequency components of the reference frame, the high-frequency components of the current frame and the reference frame comprise the high-frequency components in three directions of horizontal, vertical and diagonal; establish the corresponding triangular geometric models according to the high-frequency components of the current frame in the three directions; perform the motion search on the high-frequency components of the reference frame in the three directions by using the triangular geometric models of the current frame in the corresponding directions, calculate the motion vectors in the corresponding directions, and calculate the depth variations of the corresponding directions according to the motion vectors in the corresponding directions; perform the interpolation on the triangular geometric models in the corresponding directions according to the depth variations in the corresponding directions to construct corresponding color spaces and corresponding depth spaces, so as to obtain the high-frequency depth graphs; and complete a filtering reconstruction by performing the inversion wavelet transform on the high-frequency depth graphs and the low-frequency component of the current frame, so as to construct the three-dimensional video image. Thus a conversion to the three-dimensional image from the two-dimensional image is achieved.

DETAILED DESCRIPTION

Figure 1:
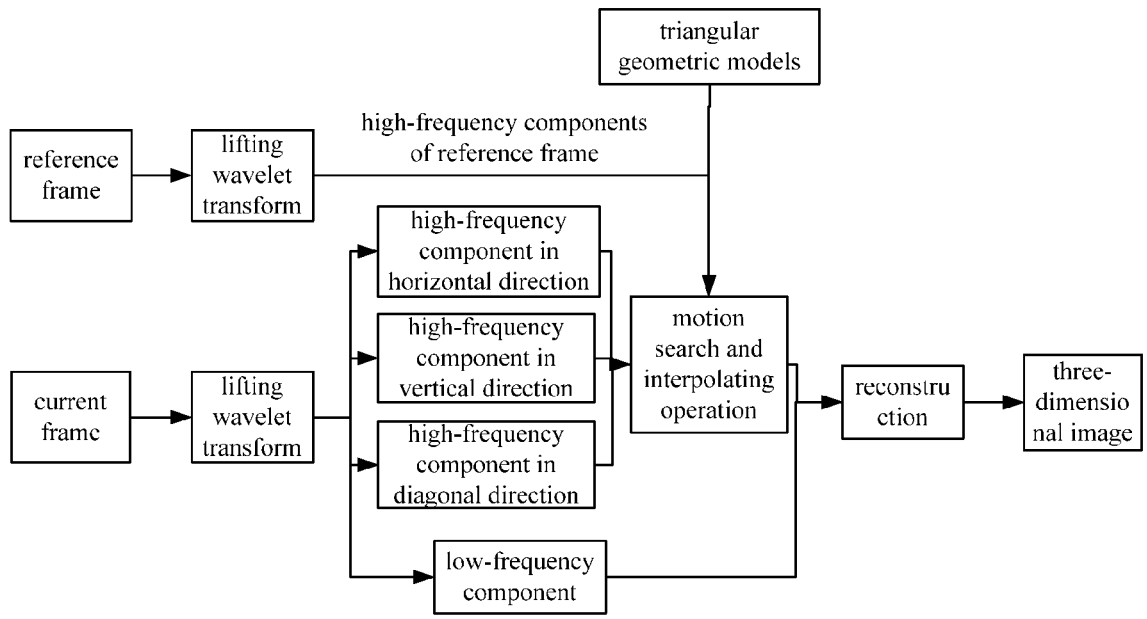
FIG. 1 is an exemplary view illustrating a process for converting a Two-Dimensional image into a Three-Dimensional image according to embodiments of the present disclosure.

A process for converting a Two-Dimensional (2D) image into a Three-Dimensional (3D) image according to embodiments of the present disclosure is illustrated in FIG. 1.

In a step 1, a lifting wavelet transform is performed on a current frame and a reference frame of a two-dimensional video image signal, respectively, to obtain high-frequency components and low-frequency component of the current frame, and high-frequency components of the reference frame.

The high-frequency components of the current frame and the high-frequency components of the reference frame comprise high-frequency components in three directions of horizontal, vertical and diagonal, respectively.

The reference frame refers to a frame having a strong correlation with the current frame in temporal and spatial. Preferably, in the embodiments of the present disclosure, a frame adjacent to the current frame in temporal may be selected as the reference frame in order to reduce calculations for the correlation. There are two frames adjacent to the current frame in temporal, and in the embodiments of the present disclosure, preferably, a frame next to the current frame, namely a next frame, may be selected as the reference frame.

Figure 2:
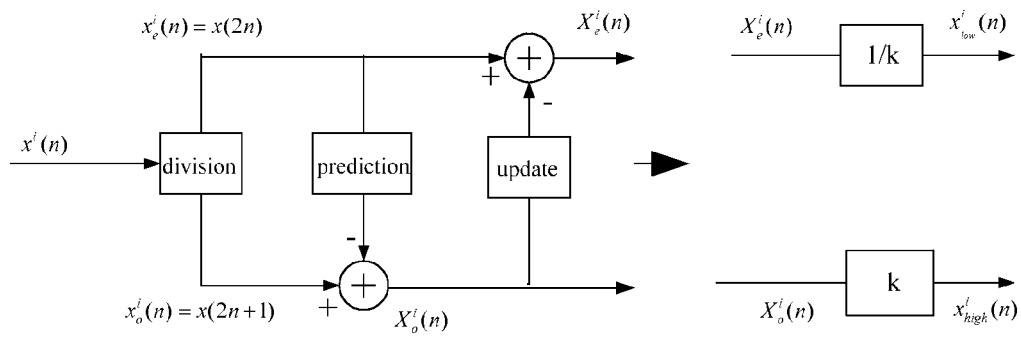
FIG. 2 is an exemplary view illustrating a process for performing a lifting wavelet transform on signals according to the embodiments of the present disclosure.

A process for performing the lifting wavelet transform on the data frame (the current frame or the reference frame) is as illustrated in FIG. 2.

In a decomposing process: an ith data frame $x^i(n)$ is decomposed as an odd sequence $x_o^i(n)=x(2n+1)$ and an even sequence $x_e^i(n)=x(2n)$.

In a predicting process: the odd sequence is predicted using the even sequence $x_e^i(n)=x(2n)$ by a correlation between the odd sequence and the even sequence to obtain a prediction value $$\sum_k p^i \cdot x_e^i(n-k),$$

then the prediction value is subtracted from the odd sequence $x_o^i(n)=x(2n+1)$ to obtain the odd sequence $X_o^i(n)$ of the ith data frame as $$X_o^i(n) = x_o^i(n) - \sum_k p^i \cdot x_e^i(n-k),$$

where the $p^i$ is a prediction operator for predicting the odd sequence using the even sequence of the ith data frame, and the k is a scaling coefficient.

In an updating process: the predicted odd sequence $X_o^i(n)$ is filtered, and the filtering result is subtracted from the even sequence $x_e^i(n)=x(2n)$ so as to obtain the even sequence $X_e^i(n)$ of the ith data frame as $$X_e^i(n) = x_e^i(n) - \sum_k U^i(k) \cdot x_o^i(n),$$

where $$\sum_k U^i(k) \cdot x_o^i(n)$$

is the filtering result of the $X_o^i(n)$, and the $U^i(k)$ is a updating operator.

At last, the $X_e^i(n)$ is multiplied with a scaling coefficient $1/k$ and the $X_o^i(n)$ is multiplied with the scaling coefficient k, so as to obtain approximate details of the data frame $x^i(n)$ as $x_{low}^i(n)=X_e^i(n)/k$ and $x_{high}^i(n)=X_o^i(n) \cdot k$, where the $x_{low}^i(n)$ is the low-frequency component of the ith data frame, while the $x_{high}^i(n)$ is the high-frequency component of the ith data frame.

In an example, the $x_{high}^i(n)$ is flittered in the three directions of horizontal, vertical and diagonal, respectively, so that the high-frequency components corresponding to the three directions of horizontal, vertical and diagonal are obtained.

In a step 2, triangular geometric models in the three directions of horizontal, vertical and diagonal are established, respectively, according to the high-frequency components of the current frame in the corresponding directions.

A triangle is a simplest planar polygon, variations of the colors (r, g, b) and the depth (z) of the respective points inside a triangle within a screen space are linear in the direction of scan lines, that is, values for the colors and depth of the adjacent pixel points only differ a fixed constant. Also, the triangle is simpler than other polygons, and other polygons may be divided into triangles. Thus the triangle model is selected as the geometric model.

After performing the lifting wavelet transform, the triangular geometric models of the high-frequency components may be established as follows.

Vertex coordinate of each of three vertexes of each of the triangular geometric models is set as (x, y, z), where the x is a coordinate in the horizontal direction, the y is a coordinate in the vertical direction, and the z is a coordinate in the diagonal direction (representing the depth). Then the triangular geometric model may be defined by the vertex coordinate (x, y, z) and vertex colors (r, g, b) of each of its three vertexes, and z and the color r, g, b are linear in the direction of scan lines.

Figure 3:
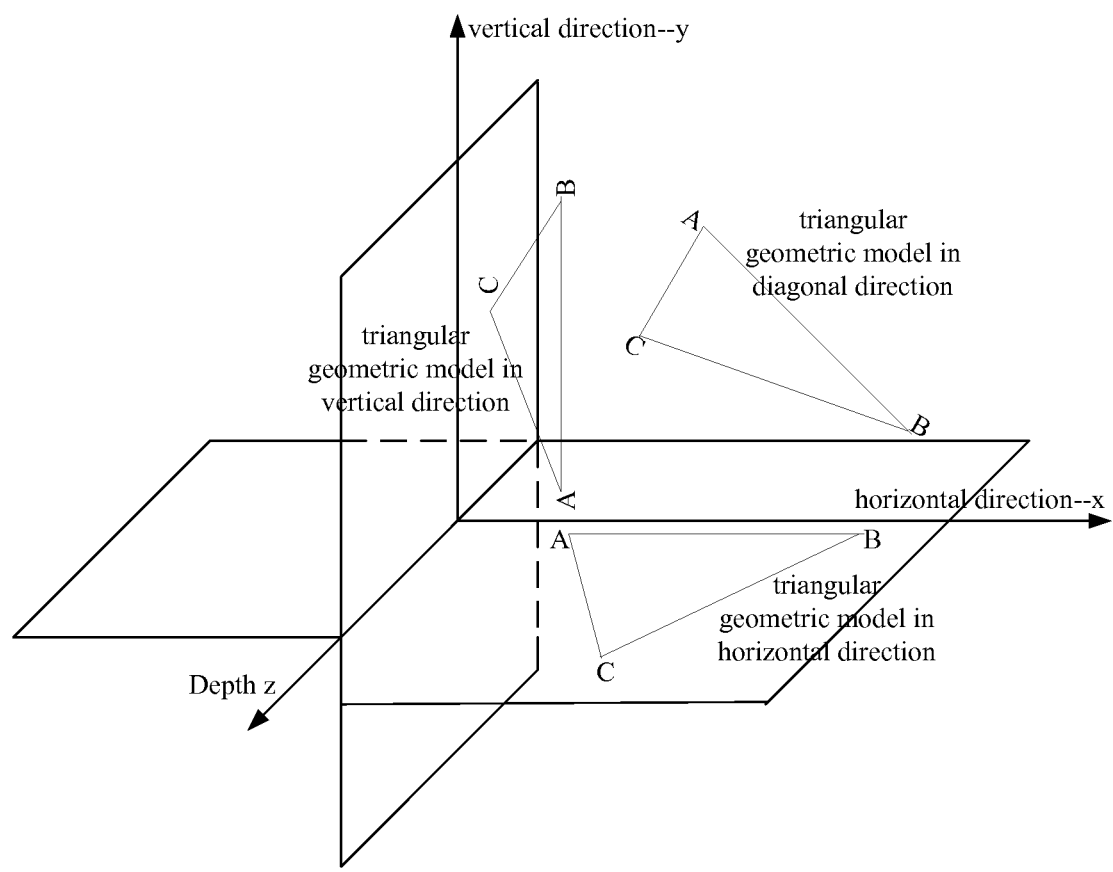
FIG. 3 is an exemplary view illustrating the establishment of triangular geometric models according to the embodiments of the present disclosure.

As illustrated in FIG. 3, for the horizontal direction, the triangular geometric model in the horizontal direction is established according to changes in the z coordinate in a situation that the y coordinate is unchanged while the x coordinate increases; for the vertical direction, the triangular geometric model in the vertical direction is established according to changes in the z coordinate in a situation that the x coordinate is unchanged while the y coordinate increases; and for the diagonal direction, given a 45° diagonal direction, the triangular geometric model in the diagonal direction is established according to changes in the z coordinate in a situation that both the y coordinate and the x coordinate change.

Figure 4:
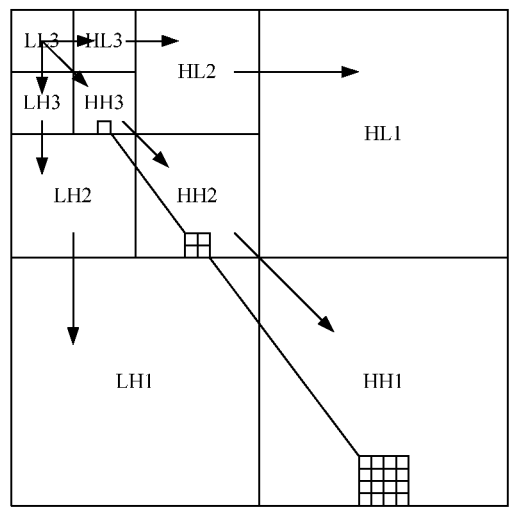
FIG. 4 is an exemplary view illustrating the establishment of the triangular geometric models when a three-level lifting wavelet transform is utilized according to the embodiments of the present disclosure.

FIG. 4 illustrates triangular geometric models established in the three directions of horizontal, vertical and diagonal, respectively, by taking a three-level lifting wavelet transform as an example. The so-called n-level lifting wavelet transform refers to that: a one-level means to perform a filtering on an original image once, while a n-level means to perform the filtering on the high-frequency components filtered in the (n−1)-level continually.

In FIG. 4, HL1, LH1 and HH1 denote the high-frequency components in the horizontal direction, the vertical direction and the diagonal direction, respectively, subjected to the one-level lifting wavelet transform; HL2, LH2 and HH2 denote the high-frequency components in the horizontal direction, the vertical direction and the diagonal direction, respectively, subjected to the two-level lifting wavelet transform; HL3, LH3 and HH3 denote the high-frequency components in the horizontal direction, the vertical direction and the diagonal direction, respectively, subjected to the three-level lifting wavelet transform. A graph formed by little corresponding grids in FIG. 4 represents a size of the image, and it may be seen from the figure that the image subjected to the lifting wavelet transform per level is scaled by a scaling parameter K.

In a step 3, a motion search is performed on the high-frequency components of the reference frame in the three directions of horizontal, vertical and diagonal, respectively, by using the triangular geometric models of the current frame, so as to obtain motion vectors in the corresponding directions, and depth variations in the corresponding directions are calculated according to the motion vectors in the corresponding direction.

The triangular geometric models in the three directions of horizontal, vertical and diagonal of the current frame are established respectively through the step 2. The motion search is performed on the high-frequency component of the reference frame subjected to the lifting wavelet transform in a direction by making the established triangular geometric model in the direction as a module.

For example, the motion search is performed on the high-frequency component in the horizontal direction of the reference frame by using the triangular geometric model in the horizontal direction of the current frame; the motion search is performed on the high-frequency component in the vertical direction of the reference frame by using the triangular geometric model in the vertical direction of the current frame; and the motion search is performed on the high-frequency component in the diagonal direction of the reference frame by using the triangular geometric model in the diagonal direction of the current frame.

Motion vectors may be calculated with an Equation (1):

$$MV = W_p \sqrt{MV_x^2 + MV_y^2 + MV_z^2}. \qquad (1)$$

where the $MV_x$ is difference between the x coordinates in the current frame and the reference frame, the $MV_y$ is difference between the y coordinates in the current frame and the reference frame, the $MV_z$ is difference between the z coordinates in the current frame and the reference frame, and the $W_p$ is a constant and may be set as 1.

The motion vector in the x direction, namely the horizontal direction, is a vector for the depth z being changing with the changes in the x coordinate. When the motion vector in the horizontal direction is calculated, lets $MV_y^2 = 0$, then the Equation (1) is evolved as $MV = W_p \sqrt{MV_x^2 + MV_z^2}$.

The motion vector in the y direction, namely the vertical direction, is a vector for the depth z being changing with the changes in the y coordinate. When the motion vector in the horizontal direction is calculated, lets $MV_x^2 = 0$, then the Equation (1) is evolved as $MV = W_p \sqrt{MV_y^2 + MV_z^2}$.

The motion vector in the z direction, namely the diagonal direction, is a vector for the depth z being changing with the changes in the x coordinate and the y coordinate, and may be calculated with the Equation (1).

The motion vector in the horizontal direction, the motion vector in the vertical direction and the motion vector in the diagonal direction may be obtained with the above Equation (1), respectively.

Depth variations may be obtained by an equation d(z) as follows:

$$d(z) = \frac{255 \times (MV - MV_{min})}{MV_{max} - MV_{min}}, \qquad (2)$$

As calculating the depth variation in a certain direction, a maximum value $MV_{max}$ and a minimum value $MV_{min}$ of the motion vectors in the direction are required to be calculated firstly. Both of the maximum value and the minimum value of the motion vectors are calculated with the Equation (1), and only their corresponding reference frames are different.

The depth variations in the three directions of horizontal, vertical and diagonal may be obtained finally with the Equation (2).

In a step 4, an interpolating operation is performed on the triangular geometric models in the three directions of horizontal, vertical and diagonal, respectively, according to the depth variations in the corresponding direction, so as to obtain high-frequency depth graphs in the corresponding directions.

In order to express differences of the depth, the interpolating operation is needed to be performed on the triangular geometric models in a direction with the depth variations in the corresponding direction. In particular, the depth value z (the depth value z is an image depth for each pixel and is known, which refers to a gray scale corresponding to the current pixel) of the triangular geometric model in the corresponding direction is interpolated with an interpolation value which is ½ of the depth variation d(Z) in the corresponding direction to get z'=z+d(Z)/2, a corresponding color space and a corresponding depth space are formed finally, and a high-frequency depth graph is obtained. The high-frequency depth graph is the high-frequency component of the z' in the corresponding direction.

In a step 5, a filtering reconstruction is completed by performing an inversion wavelet transform on the high-frequency depth graphs in the three directions of horizontal, vertical and diagonal and the low-frequency component of the current frame, respectively, and a three-dimensional video image is constructed.

This step is an inversion transform of the lifting wavelet transform (that is, a new image is obtained by performing the inversion transform on the wavelet sub-band processed), the inversion transform process aims to perform reconstruction by using the obtained high-frequency depth graphs and the low-frequency component.

Figure 5:
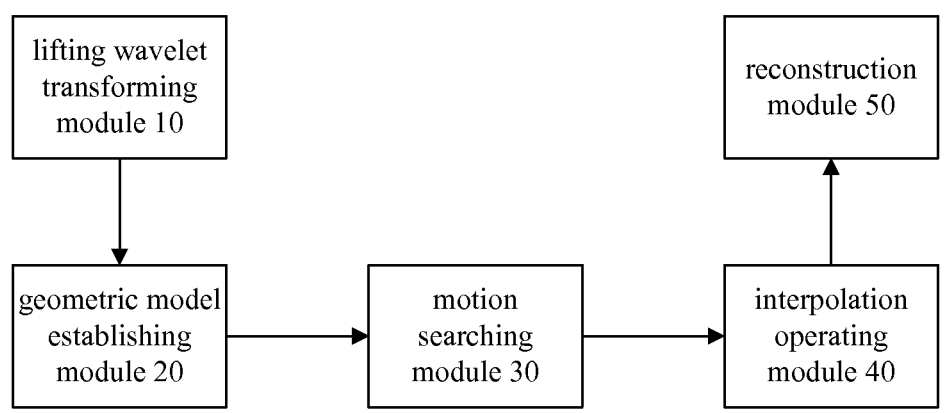
FIG. 5 is a block diagram illustrating an apparatus for converting a Two-Dimensional image into a Three-Dimensional image according to embodiments of the present disclosure.

In order to realize the above method, the present disclosure further provides an apparatus for converting a Two-Dimensional image into a Three-Dimensional image, as illustrated in FIG. 5, comprising:

a lifting wavelet transforming module 10 for performing a lifting wavelet transform on a current frame and a reference frame of a two-dimensional video image signal, respectively, to obtain high-frequency components and low-frequency component of the current frame, and high-frequency components of the reference frame, the high-frequency components comprise high-frequency components in three directions of horizontal, vertical and diagonal;

a geometric model establishing module 20 for establishing triangular geometric models in the three directions of horizontal, vertical and diagonal, respectively, according to the high-frequency components of the current frame;

a motion searching module 30 for performing a motion search on the high-frequency components of the reference frame in the three directions of horizontal, vertical and diagonal, respectively, by using the triangular geometric models of the current frame, so as to obtain motion vectors in the corresponding directions, and calculating depth variations in the corresponding directions according to the motion vectors in the corresponding directions;

an interpolation operating module 40 for performing an interpolating operation on the triangular geometric models in the three directions of horizontal, vertical and diagonal, respectively, according to the depth variations in the corresponding directions, so as to obtain high-frequency depth graphs in the corresponding directions; and a reconstruction module 50 for completing a filtering reconstruction by performing an inversion wavelet transform on the high-frequency depth graphs in the three directions of horizontal, vertical and diagonal and the low-frequency component of the current frame, respectively, so as to construct a three-dimensional video image.

The lifting wavelet transforming module 10 is further used for: setting an ith data frame $x^i(n)$ of the two-dimensional video image signal as the current frame or the reference frame; decomposing the $x^i(n)$ as an odd sequence $x_o^i(n) = x(2n+1)$ and an even sequence $x_e^i(n) = x(2n)$; predicting the odd sequence using the even sequence $x_e^i(n) = x(2n)$ by a correlation between the odd sequence and the even sequence to obtain a prediction value $$\sum_k p^i \cdot x_e^i(n-k),$$

then subtracting the prediction value from the odd sequence $x_o^i(n)=x(2n+1)$ to obtain the odd sequence $X_o^i(n)$ of the ith data frame as $$X_o^i(n) = x_o^i(n) - \sum_k p^i \cdot x_e^i(n-k),$$

where the $p^i$ is a prediction operator for predicting the odd sequence using the even sequence of the ith data frame, and the k is a scaling coefficient; filtering the predicted odd sequence $X_o^i(n)$, and subtracting the filtering result from the even sequence $x_e^i(n)=x(2n)$ so as to obtain the even sequence $X_e^i(n)$ of the ith data frame as $$X_e^i(n) = x_e^i(n) - \sum_k U^i(k) \cdot x_o^i(n),$$

where $$\sum_k U^i(k) \cdot x_o^i(n)$$

is the filtering result, and the $U^i(k)$ is a updating operator.

The lifting wavelet transforming module 10 is further used for multiplying the $X_e^i(n)$ with a scaling coefficient 1/k and multiplying the $X_o^i(n)$ with the scaling coefficient k, so as to obtain approximate details of the data frame $x^i(n)$ as $x_{low}^i(n)=X_e^i(n)/k$ and $x_{high}^i(n)=X_o^i(n) \cdot k$, where the $x_{low}^i(n)$ is the low-frequency component of the ith data frame, while the $x_{high}^i(n)$ is the high-frequency component of the ith data frame; and filtering the $x_{high}^i(n)$ in the three directions of horizontal, vertical and diagonal, respectively, so as to obtain the high-frequency components of the ith data frame in the three directions.

The geometric model establishing module 20 is further used for: setting vertex coordinate of each of three vertexes of each of the triangular geometric models as (x, y, z), where the x is a coordinate in the horizontal direction, the y is a coordinate in the vertical direction, and the z is a coordinate in the diagonal direction; establishing the triangular geometric model in the horizontal direction according to changes in the z coordinate in a situation that the y coordinate is unchanged while the x coordinate increases; establishing the triangular geometric model in the vertical direction according to changes in the z coordinate in a situation that the x coordinate is unchanged while the y coordinate increases; and establishing the triangular geometric model in the diagonal direction according to changes in the z coordinate in a situation that both the y coordinate and the x coordinate change.

The motion searching module 30 is further used for: calculating a motion vector in the horizontal direction as $MV=W_p\sqrt{MV_x^2+MV_z^2}$; calculating a motion vector in the vertical direction as $MV=W_p\sqrt{MV_y^2+MV_z^2}$; calculating a motion vector in the diagonal direction as $MV=W_p\sqrt{MV_x^2+MV_y^2+MV_z^2}$; where the $MV_x$ is difference between the x coordinates in the current frame and the reference frame, the $MV_y$ is difference between the y coordinates in the current frame and the reference frame, the $MV_z$ is difference between the z coordinates in the current frame and the reference frame, and the $W_p$ is a constant; calculating a depth variation in each of the three directions by an equation $$d(z) = \frac{255 \times (MV - MV_{min})}{MV_{max} - MV_{min}},$$

where the $MV_{min}$ is a minimum value of the motion vectors in the corresponding direction, and the $MV_{max}$ is a maximum value of the motion vectors in the corresponding direction.

The interpolation operating module 40 is further used for: interpolating the depth value z of the triangular geometric model in each of the three directions with an interpolation value which is ½ of the depth variation d(Z) in the corresponding direction to get z'=z+d(Z)/2; and acquiring the high-frequency component of the z' in the corresponding direction as the high-frequency depth graph in the corresponding direction.

The above descriptions are only preferred embodiments of the present disclosure and are not intend to limit the scope sought for protection of the present disclosure.

What is claimed is:
1. A method for converting a Two-Dimensional video image into a Three-Dimensional video image, comprising:
   in a step A, performing, by a processing unit, a lifting wavelet transform on a current frame and a reference frame of a two-dimensional video image signal, respectively, to obtain high-frequency components and low-frequency component of the current frame, and high-frequency components of the reference frame, the high-frequency components comprise high-frequency components in three directions of horizontal, vertical and diagonal;
   in a step B, establishing, by the processing unit, triangular geometric models in the three directions of horizontal, vertical and diagonal, respectively, according to the high-frequency components of the current frame;
   in a step C, performing, by the processing unit, a motion search on the high-frequency components of the reference frame in the three directions of horizontal, vertical and diagonal, respectively, by using the triangular geometric models of the current frame, so as to obtain motion vectors in the corresponding directions, and calculating depth variations in the corresponding directions according to the motion vectors in the corresponding directions;
   in a step D, performing, by the processing unit, an interpolating operation on the triangular geometric models in the three directions of horizontal, vertical and diagonal, respectively, according to the depth variations in the corresponding directions, so as to obtain high-frequency depth graphs in the corresponding directions; and
   in a step E, completing, by the processing unit, a filtering reconstruction by performing an inversion wavelet transform on the high-frequency depth graphs in the three directions of horizontal, vertical and diagonal and the low-frequency component of the current frame, respectively, so as to construct a three-dimensional video image.

2. The method for converting a Two-Dimensional video image into a Three-Dimensional video image of claim 1, wherein the step A comprises:

setting an ith data frame $x^i(n)$ of the two-dimensional video image signal as the current frame or the reference frame;

decomposing the $x^i(n)$ as an odd sequence $x_o^i(n)=x(2n+1)$ and an even sequence $x_e^i(n)=x(2n)$;

predicting the odd sequence using the even sequence $x_e^i(n)=x(2n)$ by a correlation between the odd sequence and the even sequence to obtain a prediction value $$\sum_k p^i \cdot x_e^i(n-k),$$

then subtracting the prediction value from the odd sequence $x_o^i(n)=x(2n+1)$ to obtain the odd sequence $X_o^i(n)$ of the ith data frame as $$X_o^i(n) = x_o^i(n) - \sum_k p^i \cdot x_e^i(n-k),$$

wherein the $p^i$ is a prediction operator for predicting the odd sequence using the even sequence of the ith data frame, and the k is a scaling coefficient;

filtering the predicted odd sequence $X_o^i(n)$, and subtracting the filtering result from the even sequence $x_e^i(n)=x(2n)$ so as to obtain the even sequence $X_e^i(n)$ of the ith data frame as $$X_e^i(n) = x_e^i(n) - \sum_k U^i(k) \cdot x_o^i(n),$$

wherein $$\sum_k U^i(k) \cdot x_o^i(n)$$

is the filtering result, and the $U^i(k)$ is a updating operator;

multiplying the $X_e^i(n)$ with a scaling coefficient $1/k$ and multiplying the $X_o^i(n)$ with the scaling coefficient k, to obtain approximate details of the data frame $x^i(n)$ as $x_{low}^i(n)=X_e^i(n)/k$ and $x_{high}^i(n)=X_o^i(n) \cdot k$, wherein the $x_{low}^i(n)$ is the low-frequency component of the ith data frame, while the $x_{high}^i(n)$ is the high-frequency component of the ith data frame; and filtering the $x_{high}^i(n)$ in the three directions of horizontal, vertical and diagonal, respectively, to obtain the high-frequency components of the ith data frame in the three directions.

3. The method for converting a Two-Dimensional video image into a Three-Dimensional video image of claim 2, wherein the step B comprises:

setting vertex coordinate of each of three vertexes of each of the triangular geometric models as (x, y, z), wherein the x is a coordinate in the horizontal direction, the y is a coordinate in the vertical direction, and the z is a coordinate in the diagonal direction;

establishing the triangular geometric model in the horizontal direction according to changes in the z coordinate in a situation that the y coordinate is unchanged while the x coordinate increases;

establishing the triangular geometric model in the vertical direction according to changes in the z coordinate in a situation that the x coordinate is unchanged while the y coordinate increases; and establishing the triangular geometric model in the diagonal direction according to changes in the z coordinate in a situation that both the y coordinate and the x coordinate change.

4. The method for converting a Two-Dimensional video image into a Three-Dimensional video image of claim 3, wherein the step C comprises:

calculating a motion vector in the horizontal direction as $MV=W_p\sqrt{MV_x^2+MV_z^2}$;

calculating a motion vector in the vertical direction as $MV=W_p\sqrt{MV_y^2+MV_z^2}$;

calculating a motion vector in the diagonal direction as $MV=W_p\sqrt{MV_x^2+MV_y^2+MV_z^2}$;

wherein the $MV_x$ is difference between the x coordinates in the current frame and the reference frame, the $MV_y$ is difference between the y coordinates in the current frame and the reference frame, the $MV_z$ is difference between the z coordinates in the current frame and the reference frame, and the $W_p$ is a constant;

calculating a depth variation in each of the three directions by an equation $$d(z) = \frac{255 \times (MV - MV_{min})}{MV_{max} - MV_{min}},$$

wherein the $MV_{min}$ is a minimum value of the motion vectors in the corresponding direction, and the $MV_{max}$ is a maximum value of the motion vectors in the corresponding direction.

5. The method for converting a Two-Dimensional video image into a Three-Dimensional video image of claim 4, wherein the step D comprises: interpolating the depth value z of the triangular geometric model in each of the three directions with an interpolation value which is ½ of the depth variation d(Z) in the corresponding direction to get $z'=z+d(Z)/2$; and acquiring the high-frequency component of the z' in the corresponding direction as the high-frequency depth graph in the corresponding direction.

6. An apparatus for converting a Two-Dimensional video image into a Three-Dimensional video image, comprising:

a processing unit;

a storage unit, a lifting wavelet transforming module resident on the storage unit for performing a lifting wavelet transform on a current frame and a reference frame of a two-dimensional video image signal, respectively, to obtain high-frequency components and low-frequency component of the current frame, and high-frequency components of the reference frame, the high-frequency components comprise high-frequency components in three directions of horizontal, vertical and diagonal;

a geometric model establishing module resident on the storage unit for establishing triangular geometric models in the three directions of horizontal, vertical and diagonal, respectively, according to the high-frequency components of the current frame;

a motion searching module resident on the storage unit for performing a motion search on the high-frequency components of the reference frame in the three directions of horizontal, vertical and diagonal, respectively, by using the triangular geometric models of the current frame, so as to obtain motion vectors in the corresponding directions, and calculating depth variations in the corresponding directions according to the motion vectors in the corresponding directions;

an interpolation operating module resident on the storage unit for performing an interpolating operation on the triangular geometric models in the three directions of horizontal, vertical and diagonal, respectively, according to the depth variations in the corresponding directions, so as to obtain high-frequency depth graphs in the corresponding directions; and a reconstruction module resident on the storage unit for completing a filtering reconstruction by performing an inversion wavelet transform on the high-frequency depth graphs in the three directions of horizontal, vertical and diagonal and the low-frequency component of the current frame, respectively, so as to construct a three-dimensional video image.

7. The apparatus for converting a Two-Dimensional video image into a Three-Dimensional video image of claim 6, wherein the lifting wavelet transforming module is further used for: setting an ith data frame $x^i(n)$ of the two-dimensional video image signal as the current frame or the reference frame;

decomposing the $x^i(n)$ as an odd sequence $x_o^i(n)=x(2n+1)$ and an even sequence $x_e^i(n)=x(2n)$;

predicting the odd sequence using the even sequence $x_e^i(n)=x(2n)$ by a correlation between the odd sequence and the even sequence to obtain a prediction value $$\sum_k p^i \cdot x_e^i(n-k),$$

then subtracting the prediction value from the odd sequence $x_o^i(n)=x(2n+1)$ to obtain the odd sequence $X_o^i(n)$ of the ith data frame as $$X_o^i(n) = x_o^i(n) - \sum_k p^i \cdot x_e^i(n-k),$$

wherein the $p^i$ is a prediction operator for predicting the odd sequence using the even sequence of the ith data frame, and the k is a scaling coefficient;

filtering the predicted odd sequence $X_o^i(n)$, and subtracting the filtering result from the even sequence $x_e^i(n)=x(2n)$ so as to obtain the even sequence $X_e^i(n)$ of the ith data frame as $$X_e^i(n) = x_e^i(n) - \sum_k U^i(k) \cdot x_o^i(n),$$

wherein $$\sum_k U^i(k) \cdot x_o^i(n)$$

is the filtering result, and the $U^i(k)$ is a updating operator; multiplying the $X_e^i(n)$ with a scaling coefficient $1/k$ and multiplying the $X_o^i(n)$ with the scaling coefficient k, so as to obtain approximate details of the data frame $x^i(n)$ as $x_{low}^i(n)=X_e^i(n)/k$ and $x_{high}^i(n)=X_o^i(n) \cdot k$, wherein the $x_{low}^i(n)$ is the low-frequency component of the ith data frame, while the $x_{high}^i(n)$ is the high-frequency component of the ith data frame; and filtering the $x_{high}^i(n)$ in the three directions of horizontal, vertical and diagonal, respectively, so as to obtain the high-frequency components of the ith data frame in the three directions.

8. The apparatus for converting a Two-Dimensional video image into a Three-Dimensional video image of claim 7, wherein the geometric model establishing module is further used for: setting vertex coordinate of each of three vertexes of each of the triangular geometric models as (x, y, z), wherein the x is a coordinate in the horizontal direction, the y is a coordinate in the vertical direction, and the z is a coordinate in the diagonal direction; establishing the triangular geometric model in the horizontal direction according to changes in the z coordinate in a situation that the y coordinate is unchanged while the x coordinate increases; establishing the triangular geometric model in the vertical direction according to changes in the z coordinate in a situation that the x coordinate is unchanged while the y coordinate increases; and establishing the triangular geometric model in the diagonal direction according to changes in the z coordinate in a situation that both the y coordinate and the x coordinate change.

9. The apparatus for converting a Two-Dimensional video image into a Three-Dimensional video image of claim 8, wherein the motion searching module is further used for: calculating a motion vector in the horizontal direction as $MV=W_p\sqrt{MV_x^2+MV_z^2}$; calculating a motion vector in the vertical direction as $MV=W_p\sqrt{MV_Y^2+MV_Z^2}$; calculating a motion vector in the diagonal direction as $MV=W_p\sqrt{MV_x^2+MV_y^2+MV_z^2}$; wherein the $MV_x$ is difference between the x coordinates in the current frame and the reference frame, the $MV_y$ is difference between the y coordinates in the current frame and the reference frame, the $MV_z$ is difference between the z coordinates in the current frame and the reference frame, and the $W_p$ is a constant; calculating a depth variation in each of the three directions by an equation $$d(z) = \frac{255 \times (MV - MV_{min})}{MV_{max} - MV_{min}},$$

wherein the $MV_{min}$ is a minimum value of the motion vectors in the corresponding direction, and the $MV_{max}$ is a maximum value of the motion vectors in the corresponding direction.

10. The apparatus for converting a Two-Dimensional video image into a Three-Dimensional video image of claim 9, wherein the interpolation operating module is further used for: interpolating the depth value z of the triangular geometric model in each of the three directions with an interpolation value which is ½ of the depth variation d(Z) in the corresponding direction to get z'=z+d(Z)/2; and acquiring the high-frequency component of the z' in the corresponding direction as the high-frequency depth graph in the corresponding direction.

* * * * *